United States Patent [19]

Frame

[11] 4,260,479
[45] Apr. 7, 1981

[54] CATALYTIC OXIDATION OF MERCAPTAN IN SOUR PETROLEUM DISTILLATE

[75] Inventor: Robert R. Frame, Glenview, Ill.

[73] Assignee: UOP Inc., Des Plaines, Ill.

[21] Appl. No.: 79,624

[22] Filed: Sep. 27, 1979

Related U.S. Application Data

[63] Continuation-in-part of Ser. No. 927,318, Jul. 24, 1979, Pat. No. 4,026,079, which is a continuation-in-part of Ser. No. 880,723, Feb. 24, 1978, Pat. No. 4,124,493.

[51] Int. Cl.³ .............................................. C10G 27/06
[52] U.S. Cl. ................................... 208/207; 208/206
[58] Field of Search ............................... 208/206, 207

[56] References Cited

U.S. PATENT DOCUMENTS

| | | | |
|---|---|---|---|
| 2,744,854 | 5/1956 | Urban | 208/206 |
| 3,148,137 | 9/1964 | Strong | 208/206 |
| 4,156,641 | 5/1979 | Frame | 208/207 |

*Primary Examiner*—Curtis R. Davis
*Attorney, Agent, or Firm*—James R. Hoatson, Jr.; Thomas K. McBride; William H. Page, II

[57] ABSTRACT

A process for treating a mercaptan-containing sour petroleum distillate is disclosed. The process comprises contacting said distillate with a supported mercaptan oxidation catalyst at oxidation conditions, said catalyst comprising a metal chelate and a quaternary ammonium hydroxide disposed on an adsorbent support.

19 Claims, No Drawings

CATALYTIC OXIDATION OF MERCAPTAN IN SOUR PETROLEUM DISTILLATE

CROSS-REFERRENCE TO RELATED APPLICATION

This application is a continuation-in-part of a copending application Ser. No. 927,318 filed July 24, 1979, now U.S. Pat. No. 4,026,079, which was a continuation-in-part of Ser. No. 880,723 filed on Feb. 24, 1978, and issued as U.S. Pat. No. 4,124,493 on Nov. 7, 1978, said applications hereby incorporated herein by reference thereto.

BACKGROUND OF THE INVENTION

1. Field of the Invention

The field of art to which the claimed invention pertains is processes for treating sour petroleum distillates. More specifically, the claimed invention relates to the treatment of sour petroleum distillates with an oxidizing agent in the presence of an oxidation catalyst to effect the oxidation of mercaptans in the distillate to disulfides.

2. Description of the Prior Art

Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. Depending on the source of the petroleum from which the sour distillate was derived, the boiling range of the distillate itself, and possibly the method of processing the petroleum to produce the distillate, the distillates vary widely with respect to the concentration, molecular weight and complexity of the mercaptans contained therein, and the sweetening process will vary accordingly. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

One such process relates to olefin-containing petroleum distillates. When said distillates are required to be maintained in storage for any length of time, they advantageously contain an oxidation inhibitor to obviate gum formation. The inhibitor is typically an oil-soluble phenylenediamine. When the olefin-containing distillates further contain a relatively small concentration of the more readily oxidizable mercaptans, the phenylenediamine acts as a homogeneous oxygen transfer agent and, in the presence of an alkaline reagent, promotes the oxidation of mercaptans and the formation of disulfides. It is to be noted that at least one-third of the mercaptans are consumed by interaction with the olefin content of the sour distillate. The process is commonly referred to as inhibitor sweetening. The homogeneous phenylenediamine is not recoverable but is expended in the sweetening process, and as the amount of the phenylenediamine required to effect an economical rate of oxidation becomes excessive, the process becomes ineffective as a sweetening process and resort must be had to other means. It is known that inhibitor sweetening, which is essentially a batch type of process more suited to the treatment of sour distillates in storage, functions only with respect to olefin-containing distillates—the olefin being essential to the inhibitor sweetening process. Over a period of time, usually measured in hours or days, the stored distillate may become doctor sweet depending on the complexity and the concentration of the mercaptans contained therein. While certain quaternary ammonium compounds have been used in conjunction with the homogeneous phenylenediamine catalyst to accelerate the sweetening process as shown in U.S. Pat. No. 3,164,544, the process remains subject to the general limitations of inhibitor sweetening, i.e., ineffective with respect to sour petroleum distillates containing mercaptans other than primary and secondary mercaptans, increasingly ineffective with respect to petroleum distillates containing in excess of about 150 ppm. mercaptan sulfur, and restricted to batch processing procedures rather than the commercially more desirable continuous processing methods.

A commonly used continuous treatment process for sour petroleum distillates entails treating the distillate in contact with a heterogeneous metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. The continuous type of operation requires a substantially lesser contact time than required of inhibitor sweetening. The metal phthalocyanine catalyst, which is recovered and recycled for continuous use, is not limited to use in conjunction with an olefin-containing petroleum distillate, but is equally effective with regard to olefin-free distillates to provide a doctor sweet product.

Certain of the higher boiling sour petroleum distillates, generally boiling in excess of about 275° F., contain highly hindered branched chain and aromatic thiols, and/or higher molecular weight tertiary and polyfunctional mercaptans, which are at most only partially soluble in the catalyst-containing caustic solution of the liquid-liquid treating system. Sour petroleum distillates containing these more difficulty oxidizable mercaptans are more effectively treated in contact with a metal phthalocyanine catalyst disposed on a high surface area adsorptive support—usually an activated charcoal. The distillate is treated in contact with the supported metal phthalocyanine catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

Heretofore, the practice of catalytically treating mercaptan-containing sour petroleum distillates has involved the introduction of alkaline agents, usually sodium hydroxide, into the sour petroleum distillate prior to or during the treating operation. (U.S. Pat. No. 3,108,081; U.S. Pat. No. 4,156,641). The prior art also suggests the addition to the petroleum distillate along with certain alkaline agents of certain non-alkaline additives. (U.S. Pat. No. 4,124,493; U.S. Pat. No. 4,033,860). In addition, the prior art suggests the use in an alkaline environment of certain catalytic composites produced from metal phthalocyanine solutions containing certain non-alkaline additives. (U.S. Pat. No. 4,087,378; U.S. Pat. No. 4,124,531).

What has been needed, but which the prior art does not suggest, is a process for treating sour petroleum distillates using a catalystic composite of sufficient activity that addition to the petroleum distillate of an alkaline agent is not required. The method of this invention is such a process. The prior art does not disclose or suggest the treating of a mercaptan-containing sour petroleum distillate by contacting the distillate at oxidation conditions with an oxidizing agent and a catalytic composite comprising a metal chelate and a quaternary ammonium hydroxide disposed on an adsorptive support. The treating process of this invention can be accomplished without the necessity of addition of an alkaline agent with consequent savings in materials handling and storage expenses, and avoidance of use of hazardous alkaline chemicals in the treating process.

SUMMARY OF THE INVENTION

It is a broad objective of my invention to present a novel method for treating sour petroleum distillates.

In one of its broad aspects, the present invention embodies a method for treating a mercaptan-containing sour petroleum distillate by contacting the distillate with a catalytic composite comprising a metal chelate and a quaternary ammonium hydroxide disposed on a solid adsorptive support, said quaternary ammonium hydroxide being represented by the structural formula

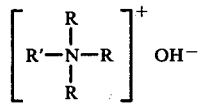

wherein R is a hydrocarbon radical containing up to about 20 carbon atoms and selected from the group consisting of alkyl, cycloalkyl, aryl, alkaryl and aralkyl and R' is a substantially straight chain alkyl radical containing from about 5 to about 20 carbon atoms.

One of the more specific embodiments of the invention is a method for treating a mercaptan-containing sour petroleum distillate with a catalytic composite comprising from about 0.1 to about 10 wt. % metal phthalocyanine and from about 1 to about 50 wt. % benzyldimethylalkylammonium hydroxide impregnated on an activated charcoal support, the alkyl substituent of said benzyldimethylalkylammonium hydroxide being a substantially straight chain alkyl radical containing from about 5 to about 20 carbon atoms.

A still more specific embodiment of this invention relates to a method of treating a mercaptan-containing sour petroleum distillate with a catalytic composite comprising from about 0.1 to about 2 wt. % cobalt phthalocyanine monosulfonate and from about 5 to about 35 wt. % benzyldimethylalkylammonium hydroxide impregnated on an activated charcoal support, the alkyl substituent of said benzyldimethylalkylammonium hydroxide being a substantially straight chain alkyl radical containing from about 12 to about 18 carbon atoms.

Other objects and embodiments of this invention will become apparent in the following detailed description.

DESCRIPTION OF THE INVENTION

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g., cobalt, tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; and the like. Metal phthalocyanines are a preferred class of metal chelates.

The metal phthalocyanines which can be employed to catalyze the oxidation of mercaptans generally inclhude magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The quaternary ammonium hydroxide component of the catalytic composite of this invention is represented by the structural formula

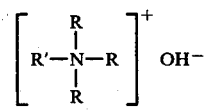

wherein R is a hydrocarbon radical containing up to about 20 carbon atoms and selected from the group consisting of alkyl, cycloalkyl, aryl, alkaryl and aralkyl and R' is a substantially straight chain alkyl radical containing from about 5 to about 20 carbon atoms. It is preferred that one R radical be an alkyl radical containing from about 12 to about 18 carbon atoms, and another R radical be a benzyl radical. Preferred quaternary ammonium hydroxides thus include benzyldimethyldodecylammonium hydroxide, benzyldimethyltetradecylammonium hydroxide, benzyldimethylhexadecylammonium hydroxide, benzyldimethyloctadecylammonium hydroxide, and the like. Other suitable quaternary ammonium hydroxides include dimethylcyclohexyloctylammonium hydroxide, diethylcyclohexyloctylammonium hydroxide, dipropylcyclohexyloctylammonium hydroxide, dimethylcyclohexyldecylamminium hydroxide, diethylcyclohexyldecylammonium hydroxide, dipropylcyclohexyldecylammonium hydroxide, dimethylcyclohexyldodecylammonium hydroxide, diethylcyclohexyldodecylammonium hydroxide, dipropylcyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, and the like. Other suitable quaternary ammonium hydroxides are described in U.S. Pat. No. 4,156,641.

The adsorbent support employed herein can be any of the well known solid adsorbent materials generally utilized as catalyst support or carrier material. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the petroleum distillate at the alkaline reaction conditions existing in the treating zone. Charcoal, and particularly, activated charcoal, is preferred because of its capacity for metal phthalocyanine, and because of its stability under treating conditions.

The quaternary ammonium hydroxides of this invention, as well as the metal chelate, particularly the metal phthalocyanines, are readily adsorbed on the adsorbent support. The quaternary ammonium hydroxide may comprise up to about 50 wt. % or more of the catalytic composite. In the sweetening process herein contemplated, the quaternary ammonium hydroxide will suitably comprise from about 1 to about 50 wt. %, and preferbly from about 5 to about 35 wt. % of the said composite. In general, up to about 25 wt. % metal phthalocyanine can be adsorbed on the adsorbent support and still form a stable catalytic composite. A lesser amount in the range of from about 0.1 to about 10 wt. % generally forms a suitably active catalytic composite. The activity advantage derived from metal phthalocyanine concentrations in excess of about 2 wt. % has not heretofore warranted use of higher concentrations. However, in view of the significant increase in activity derived from the use of the quaternary ammonium hydroxides of this invention in conjunction with minimal metal phthalocyanine concentrations, it is contemplated that the higher concentration will become effective to promote a further increase in the rate of mercaptan oxidation.

The quaternary ammonium hydroxide and the metal chelate components can be disposed on the adsorbent support in any conventional or otherwise convenient manner, and said components can be disposed on said support simultaneously from a common aqueous or alcoholic solution and/or dispersion thereof, or separately and in any desired sequence. Disposition can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic impregnating solution and/or dispersion to dispose a given quantity of the ammonium hydroxide and metal chelate components thereon. One preferred method involves the use of a steam-jacketed rotary dryer. The adsorbent support is immersed in the ammonium hydroxide-metal chelate solution and/or dispersion contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for disposing the ammonium hydroxide and metal chelate components on the adsorbent support comprises predisposing the support in a sour petroleum distillate treating zone or chamber as a fixed bed and passing the ammonium hydroxide-metal chelate solution and/or dispersion through the bed in order to form the catalytic composite in situ. This method allows the solution and/or dispersion to be recycled one or more times to achieve a desired concentration of the ammonium hydroxide and metal chelate components on the adsorbent support. In still another alternative method, the adsorbent may be predisposed in said treating zone or chamber, and the zone or chamber thereafter filled with the impregnating solution and/or dispersion to soak the support for a predetermined period.

In the process of sweetening a sour petroleum distillate, it has heretofore been the practice to oxidize the mercaptans contained therein in the presence of an alkaline agent. With respect to the method of this invention, those distillates containing the more readily oxidized mercaptans can be treated in the absence of added alkaline agent.

However, treatment of sour petroleum distillates in contact with the catalytic composite of the method of this invention can be performed in the presence of an alkaline agent as heretofore practiced. A supported mercaptan oxidation catalyst is typically initially saturated with the alkaline agent, and the alkaline agent thereafter passed in contact with the catalyst bed, continuously or intermittently as required, admixed with the sour petroleum distillate. Any suitable alkaline agent may be employed. An alkali metal hydroxide in aqueous solution, e.g., sodium hydroxide in aqueous solution, is most often employed. The solution may further comprise a solubilizer to promote mercaptan solubility, e.g., alcohol, and especially methanol, ethanol, n-propanol, isopropanol, etc., and also phenols, cresols, and the like. A particularly preferred alkaline reagent is an aqueous caustic solution comprising from about 2 to about 30 wt. % sodium hydroxide. The solubilizer, when employed, is preferably methanol, and the alkaline solution may suitably comprise from about 2 to about 100 vol. % thereof. Sodium hydroxide and potassium hydroxide constitute the preferred alkaline reagents, others including lithium hydroxide, rubidium hydroxide and cesium hydroxide are also suitably employed.

The process of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and counter-current to the distillate separately charged thereto.

The catalytic composite of this invention is both active and stable. Accordingly, the method of this invention can be practiced in a fixed bed to treat large volumes of sour petroleum distillates. As heretofore mentioned, the quaternary ammonium hydroxide and metal chelate components of the catalytic composite used in the method of this invention are readily adsorbed on the solid adsorbent support component thereof. Thus, any of the said quaternary ammonium hydroxide or metal chelate components which may in time be leached from the support and carried away in the reactant stream can be easily restored to the catalyst composite in situ by introducing either or both of said components to the sweetening process, for example, in admixture with the alkaline reagent, to be adsorbed on the adsorbent support in the treating zone.

The following example is presented in illustration of one preferred embodiment of this invention and is not intended as an undue limitation on the generally broad scope of the invention as set out in the appended claims.

EXAMPLE

In the preparation of the catalytic composite which can be used in the method of this invention, an impregnating solution and/or dispersion is formulated by adding 0.75 gms. of cobalt phthalocyanine monosulfonate and 23.5 gms. of a 50% alcoholic solution of dimethylbenzylalkylammonium hydroxide to 250 ml. of deionized water in a rotary steam evaporator. The benzyldimethylalkylammonium hydroxide is preferably benzyldimethyldodecylammonium hydroxide, benzyldimethyltetradecylammonium hydroxide, benzyldimethylhexadecylammonium hydroxide, and/or benzyldimethyloctadecylammonium hydroxide. About 250 cc of 10×30 mesh activated charcoal particles are immersed in the impregnating solution and tumbled therein for about 1 hour by the rotating motion of the evaporator. Steam is thereafter applied to the evaporator jacket, and the impregnating solution evaporated to dryness in contact with the tumbling charcoal particles over a one hour period.

A sour kerosene feedstock boiling in the 352°–454° F. range and containing from about 200 ppm. to about 500 ppm. mercaptan sulfur is converted to a doctor sweet product on changing the feedstock downflow through the catalytic composite at a liquid hydrocarbon space velocity of from about 0.5 to about 3.0, the catalytic composite being disposed as a fixed bed in a tubular reactor. The kerosene feedstock is charged under sufficient air pressure to provide about twice the stoichiometric amount of oxygen required to oxidize the mercaptan content of the kerosene.

Pursuant to one embodiment of this invention, the catalyst bed is initially wetted with a 2 molar aqueous dimethylbenzylalkylammonium hydroxide solution, about 10 cc of said solution per 100 cc of catalyst being subsequently added to the catalyst bed at 12 hour intervals admixed with the sour kerosene charged thereto. The dimethylbenzylalkylammonium hydroxide employed comprises a mixture of dimethylbenzyldodecylammonium hydroxide, dimethylbenzyltetradecylammonium hydroxide, dimethylbenzylhexadecylammonium hydroxide and dimethylbenzyloctadecylammonium hydroxide.

Pursuant to another embodiment of this invention, the kerosene feedstock is charged to the catalyst bed without the addition of an alkaline agent.

I claim as my invention:

1. A method for treating a mercaptan-containing sour petroleum distillate to oxidize the mercaptan present in said distillate, said method comprising contacting said distillate at oxidation conditions with an oxidizing agent and a preformed catalytic composite comprising both a metal chelate and a quaternary ammonium hydroxide impregnated upon an adsorptive support, said quaternary ammonium hydroxide being represented by the structural formula

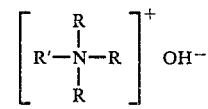

wherein R is a hydrocarbon radical containing up to about 20 carbon atoms and selected from the group consisting of alkyl, cycloalkyl, aryl, alkaryl and aralkyl and R' is a substantially straight chain alkyl radical containing from about 5 to about 20 carbon atoms.

2. The method of claim 1 wherein an alkaline agent in addition to that disposed on said adsorptive support is contacted with said distillate in the presence of said oxidizing agent and said catalytic composite.

3. The method of claim 1 wherein said treating is conducted without addition to said distillate of an alkaline agent other than that disposed on said adsorptive support.

4. The method of claim 1 wherein at least one of the R radicals is selected from the group consisting of aryl, alkaryl and aralkyl.

5. The method of claim 1 wherein said quaternary ammonium hydroxide component comprises from about 1 to about 50 wt. % of said catalytic composite.

6. The method of claim 1 wherein said quaternary ammonium hydroxide component comprises from about 5 to about 35 wt. % of said catalytic composite.

7. The method of claim 1 wherein R' is a substantially straight chain alkyl radical containing from about 12 to about 18 carbon atoms.

8. The method of claim 1 wherein at least one of the R radical is benzyl.

9. The method of claim 1 wherein said quaternary ammonium hydroxide is benzyldimethyldodecylammonium hydroxide.

10. The method of claim 1 wherein said quaternary ammonium hydroxide is benzyldimethyltetradecylammonium hydroxide.

11. The method of claim 1 wherein said quaternary ammonium hydroxide is benzyldimethylhexadecylammonium hydroxide.

12. The method of claim 1 wherein said quaternary ammonium hydroxide is benzyldimethyloctadecylammonium hydroxide.

13. The method of claim 1 wherein said adsorptive support is an activated charcoal.

14. The method of claim 1 wherein said metal chelate is a metal phthalocyanine.

15. The method of claim 1 wherein said metal chelate comprises from about 0.1 to about 10 wt. % of said catalytic composite.

16. The method of claim 1 wherein said metal chelate comprises from about 0.1 to about 2 wt. % of said catalytic composite.

17. The method of claim 1 wherein said metal chelate is a cobalt phthalocyanine.

18. The method of claim 1 wherein said metal chelate is a vanadium phthalocyanine.

19. The method of claim 1 wherein said metal chelate is cobalt phthalocyanine monosulfonate.

* * * * *